United States Patent [19]
Vasudeva

[11] Patent Number: 5,701,935
[45] Date of Patent: Dec. 30, 1997

[54] PROTECTIVE PLUG FOR USE IN WELDING OF THREADED BOSSES

[75] Inventor: Kailash C. Vasudeva, Waterloo, Canada

[73] Assignee: Maxtech Manufacturing Inc., Waterloo, Canada

[21] Appl. No.: 578,482

[22] Filed: Dec. 26, 1995

[51] Int. Cl.$^6$ ................................................ F16L 55/105
[52] U.S. Cl. ......................... 138/89; 138/92; 138/96 T; 408/222; 470/198
[58] Field of Search ........................ 138/89, 90, 92, 138/94, 96 T; 408/222; 470/198

[56] References Cited

U.S. PATENT DOCUMENTS

| | | | |
|---|---|---|---|
| 2,387,720 | 10/1945 | Davis | 408/222 |
| 4,090,808 | 5/1978 | Nannen | 408/222 |
| 4,438,784 | 3/1984 | Bobichon et al. | 138/92 |
| 4,661,028 | 4/1987 | Sanger | 408/165 |
| 4,887,646 | 12/1989 | Groves | 138/90 |
| 5,547,042 | 8/1996 | Platt | 138/89 |

*Primary Examiner*—David Scherbel
*Assistant Examiner*—James F. Hook
*Attorney, Agent, or Firm*—R. Craig Armstrong

[57] ABSTRACT

A plug is used in welding a female-threaded boss into a hole through a part, the plug being installed in the boss prior to welding (preferably at the plant of the supplier of the bosses, so that they already have the plug installed when they arrive for welding). The plug has a head and a cylindrical portion extending below the head, the cylindrical portion having male threads adapted to be received by the female threads of the boss. The head has a minimum transverse dimension of at least the maximum transverse dimension of an upper surface of the boss so as to completely cover the upper surface. The cylindrical threaded portion of the plug has thread-cutting edges defined therein, configured to re-tap the threads of the boss when an installed plug is rotated in the direction necessary to remove the plug from the boss. The head of the plug has a recess therein, having two portions, namely an upper circular recess, and a lower hexagonal recess, the circular recess being configured to receive a tool to permit the plug to be held in place while the weld is effected, and the hexagonal recess permitting a tool to be inserted once the plug is no longer needed, so that it can be unthreaded from the boss. Optionally, a copper cup washer may be used, the cup washer being configured to fit between the head and the boss, with the cup portion extending upwardly away from the boss, to isolate the head and the plug from the boss, thereby reducing any likelihood of the plug and the boss being accidentally welded together.

6 Claims, 3 Drawing Sheets

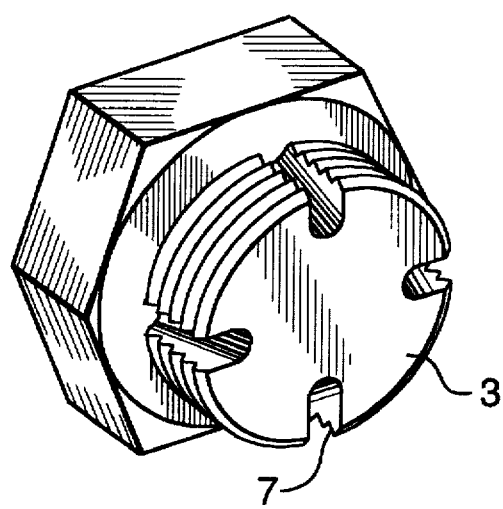
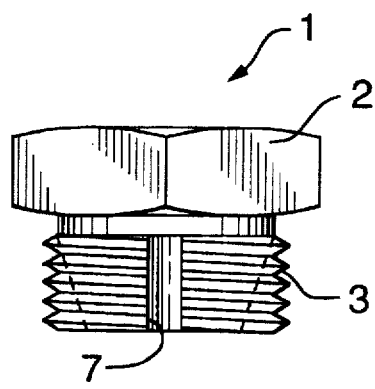
FIG.5
FIG.6
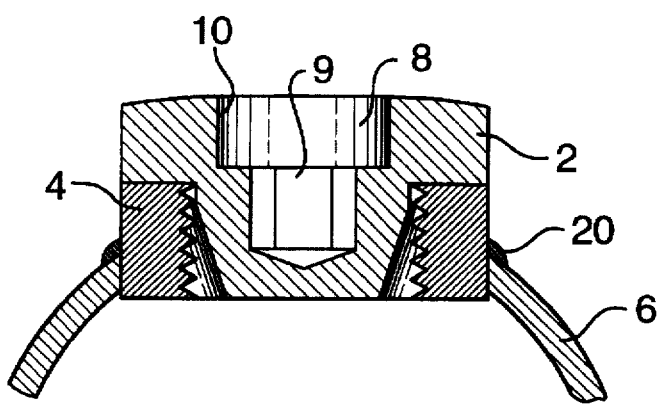
FIG.7
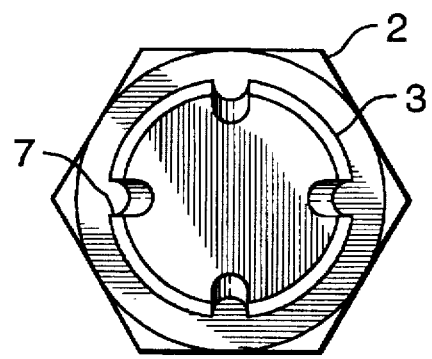
FIG.8

PROTECTIVE PLUG FOR USE IN WELDING OF THREADED BOSSES

BACKGROUND OF THE INVENTION

1. Field of the Invention

This invention relates to the welding of an internally threaded boss into a hole through a metal wall.

A typical example is the welding of an exhaust gas recirculation (EGR) boss to the exhaust pipe of a vehicle. The EGR boss eventually has an EGR sensor threaded into it, to project into the exhaust stream. Although that is the specific intended use for the invention, and the invention will be described with reference to that use, it should be clear that the invention could be applied to any other situation where it is desired to weld a similar boss into a hole.

2. Description of the Prior Art

In the conventional assembly of exhaust systems, the exhaust pipe is provided with a hole which is just slightly larger than the outer perimeter of the boss, which is normally but not necessarily circular in cross-section. A tool is then used to position a threaded boss in the hole, the tool extending into the threaded hole of the boss and having a spring-loaded ball which presses outwardly against the threads to hold the boss, and a weld is formed around the outside of the boss, between the boss and the pipe adjacent the hole.

There are several problems with this conventional approach. First of all, there is the possibility of welding a boss which has not been threaded, as has been known to happen, despite normal quality control checks. If the unthreaded boss makes it as far as the vehicle assembly line, as is then likely, it could necessitate shutting down the production line to remove and replace the exhaust system, since the EGR sensor then could not be installed on the vehicle's exhaust system.

Secondly, effecting the weld slightly deforms the boss, due to thermal expansion and contraction, which varies unpredictably depending on factors such as weld temperatures, welding operator, etc. This can result in the EGR sensor not threading into the boss very easily or smoothly, due to the deformation of the threads. To avoid problems, the holes are frequently retapped after welding, thereby adding to the manufacturing cost.

Thirdly, there is risk of weld splatter depositing on the upper surface of the boss, i.e. the surface against which the EGR sensor rests, or in the threads. Either one of these can interfere with or prevent proper installation of the EGR sensor. To avoid this problem, a temporary threaded plug can be installed, which is then removed after welding. One problem with this solution is that the tool to extend into the boss to hold it in place for welding must then be inserted from inside the exhaust pipe, which is awkward and not always possible. Another problem with this solution is that the plug can also be unintentionally welded to the boss.

Another aspect of the current exhaust system manufacturing process is that after the exhaust system is fully assembled, before shipment to the vehicle assembly plant where the EGR sensors are installed, the systems are pressure-tested for leaks. In order for this test to be made, plugs must be positioned in the EGR sensor holes. Conventionally, the plugs are installed immediately prior to the testing, and removed after the testing. This extra step inevitably adds to the cost of production.

SUMMARY OF THE INVENTION

It is an object of the invention to avoid the above problems, in order to produce reliable, defect-free parts, and furthermore in order to save steps in leak testing if leak testing is conducted.

In the invention, a plug is provided for insertion in the boss. The head of the plug includes a recess which can be used by the standard tool to hold the plug/boss assembly. The plug has a male tapping thread, oriented to retap the female thread of the boss on removal of the plug only, to thereby compensate for any deformation resulting from welding the boss into position. There is no tapping action, or other effect on the threads, when the plug is inserted. Preferably, the tapping threads are configured with an effective diameter such that tapping action on removal only takes place if the threads of the boss have shrunk to below the minimum diameter in the tolerance range for the threads. In other words, preferably there is tapping only when it is definitely necessary to increase the thread diameter.

Optionally, a copper cup washer may also be provided, to shield the plug from the weld, so that it is not unintentionally welded to the boss.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 5 is a perspective view of a second version of the plug;

FIG. 6 is a side elevation view of the second version;

FIG. 7 is a cross-section of the second version, installed in the boss;

FIG. 8 is a bottom view of the second version;

DETAILED DESCRIPTION OF THE PREFERRED EMBODIMENT

Figure 1:
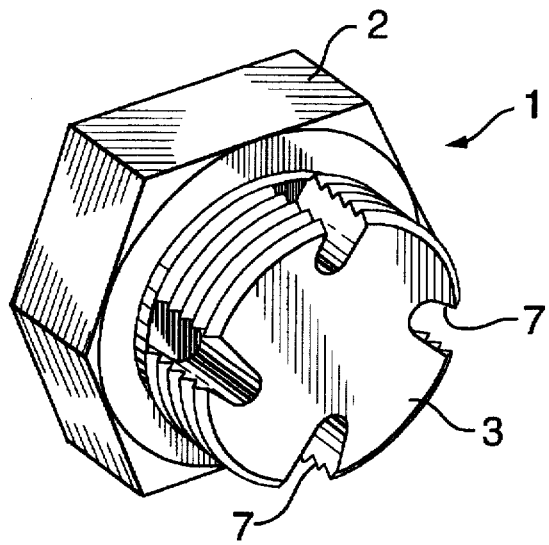
FIG. 1 is a perspective view of a first version of the plug.
Figure 2:
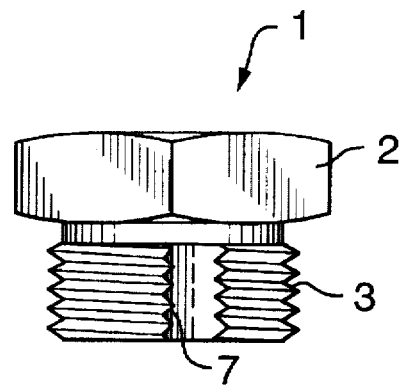
FIG. 2 is a side elevation view of the plug.
Figure 3:
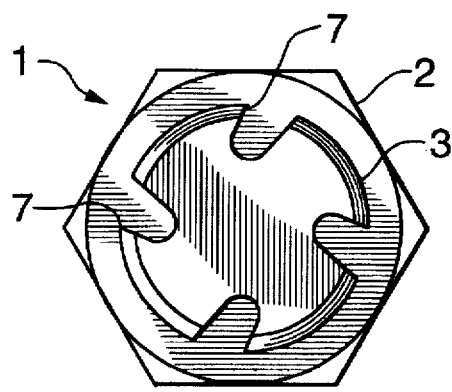
FIG. 3 is a bottom view of the plug.
Figure 4:
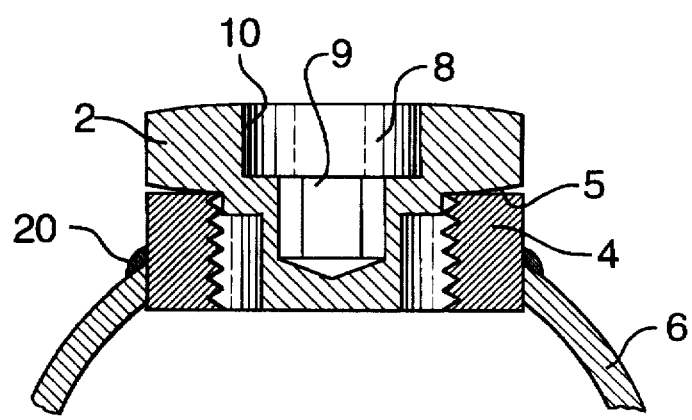
FIG. 4 is a cross-section of the plug installed in the boss.

Referring to the drawings, FIGS. 1-4 show a first version of the plug 1, which has a hexagonal head 2 and a male threaded portion 3 extending below the head. The plug is for installation on a boss 4, normally but not necessarily cylindrical, such that the plug completely covers the upper surface 5 of the boss. The boss is intended to be welded into a hole through a metal surface such as an exhaust pipe 6, with a weld 20 being created.

The threaded portion of the plug is configured to provide cutting edges 7, to re-tap the female threads of the boss on removal of the plug. It follows from this that the material chosen for the plug needs to be sufficiently hard to be able to cut a thread, e.g. preferably about 55 on the Rockwell C-scale.

The head 2 of the plug has a recess therein, having two portions, namely an upper circular recess 8, and a lower hexagonal recess 9. The circular recess can receive a tool of the type conventionally used to hold the boss, i.e. a ball-spring arrangement which expands outwardly against the threads of boss conventionally, or in this case against the side walls 10 of the upper recess. This permits the plug to be held in place conveniently, using conventional tooling, while the weld is effected. The hexagonal recess 9 permits a tool to be inserted (manually or preferably automatically) once the plug is no longer needed, so that it can be unthreaded from the boss. The cutting edges 7 then serve their tapping function.

The result from the invention is that the various problems referred to above are avoided. First of all, there is the no possibility of welding a boss which has not been threaded, since the plug could not be inserted into the boss if there were no threads in the first place. Secondly, the retapping which takes place when the plug is removed clears the threads and compensates for any deformation from the heat of welding. Thirdly, since the welding takes place with the plug in place, there is no possibility of weld splatter depositing on the upper surface 5 of the boss, or in the threads. Although it is presently known to use a temporary threaded plug to prevent this, that is an extra step, and it makes it very difficult to hold and position the boss for welding. It should be added that in the case of the head 2 being hexagonal, which is not essential, the minimum diameter (i.e. flat to flat) should be at least the diameter of the upper surface of the boss. Although a hexagonal head is illustrated in the accompanying drawings, it should be appreciated that the head of the plug could be round, if desired, there being no need for it to be hexagonal.

Preferably, the plugs are installed automatically at the plant of the manufacturer/supplier of the bosses, so that they already have the plug installed when they arrive for welding. This permits greater efficiency in the overall manufacturing process.

Another, advantage of the invention is that the installation of the plug results in a plug being already in place for pressure-testing of the exhaust system for leaks, without an extra step being required.

FIGS. 5–8 show a second version of the plug, which is almost identical in principle, except that the configuration of the tap portion is different. The flutes for the tapping portions of the thread are straight and tapered, as opposed to the shape shown in FIGS. 1–4.

Figure 9:
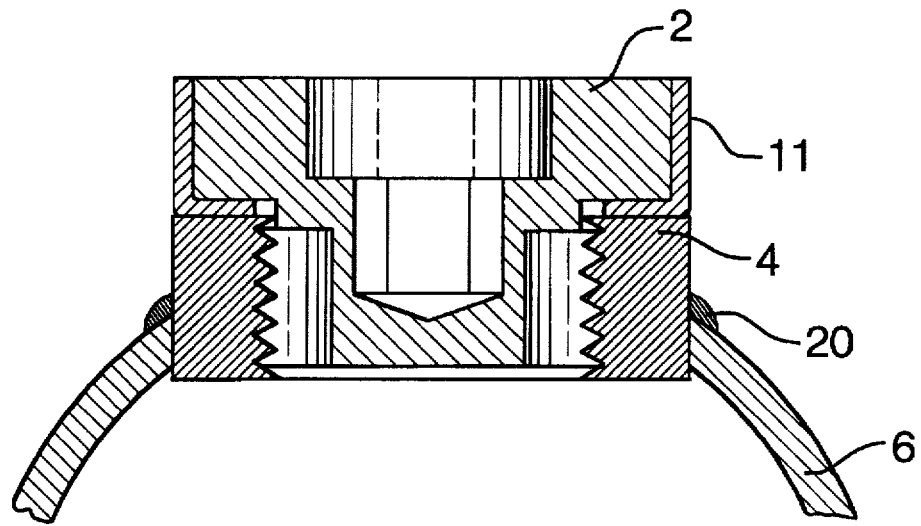
FIG. 9 is a cross-section of the first version of the plug, with a first version of the optional copper cup washer.
Figure 10:
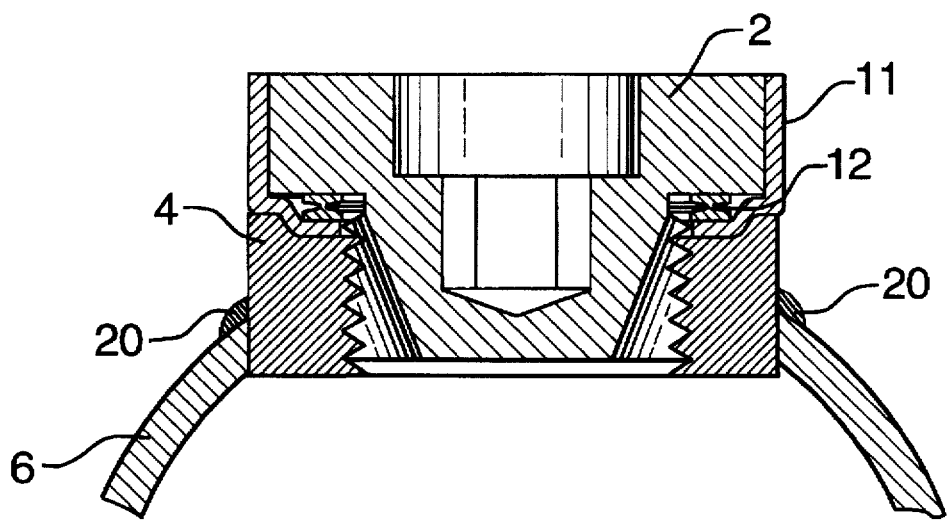
FIG. 10 is a cross-section similar to FIG. 9, but showing a second version of the optional copper cup washer.

Optionally, to avoid the possibility of unintentionally welding the plug to the boss, as can happen with the conventional temporary plugs, a copper cup washer 11 can be used in addition to the plug, as shown in FIGS. 9 and 10. The cup washer guards the interface between the plug and the boss, and because it is copper, it cannot be accidentally welded to the boss or to the plug.

FIG. 10 shows a more complex version of the cup washer than in FIG. 9, including a packing ring 12 to ensure a better seal between the washer and the plug. This is probably not necessary in most applications, but could be considered. In the case of exhaust system pressure testing, it is not that critical, since the test pressures are relatively low.

It will be appreciated that the above description relates to the preferred embodiments by way of example only. Many variations on the invention will be obvious to those knowledgeable in the field, and such obvious variations are within the scope of the invention as described and claimed, whether or not expressly described.

It should be further appreciated that this invention is not limited to exhaust systems, but could be applied in other situations where it is necessary to weld a threaded boss to a part.

What is claimed as the invention is:

1. A plug and boss combination for use in welding said boss into a hole through a part, said boss having an upper surface and a female-threaded cylindrical hole extending through said boss from said upper surface, said plug comprising a head and a cylindrical portion extending below the head, the cylindrical portion having male threads adapted to be received by the female threads of the boss, the head having a minimum transverse dimension of at least the maximum transverse dimension of an upper surface of the boss so as to completely cover said upper surface, the cylindrical threaded portion of the plug having at least one thread-cutting edge defined therein, configured to re-tap the threads of the boss when an installed plug is rotated in the direction necessary to remove the plug from the boss.

2. A plug and boss combination as recited in claim 1, where the head of the plug has a recess therein, having two portions, namely an upper circular recess, and a lower hexagonal recess, the circular recess being configured to receive a first tool to permit the plug to be held in place while the weld is effected, and the hexagonal recess permitting a second tool to be inserted once the plug is no longer needed, so that it can be unthreaded from the boss.

3. A plug and boss combination as recited in claim 1, in combination with a copper cup washer said cup washer having a centrally apertured flat portion positioned between said head and said boss, and a cup portion extending upwardly away from said flat portion and alongside said head, to isolate said head from said boss, thereby shielding said head end reducing any likelihood of said plug and said boss being accidentally welded together.

4. A method of welding a female-threaded boss into a hole through a part, comprising the steps of:

first installing a plug in said boss, said plug comprising a head and a cylindrical portion extending below the head, the cylindrical portion having male threads adapted to be received by the female threads of the boss, the head having a minimum transverse dimension of at least a maximum transverse dimension of an upper surface of the boss so as to completely cover said upper surface, the cylindrical threaded portion of the plug having thread-cutting edges defined therein, configured to re-tap the threads of the boss when an installed plug is rotated in the direction necessary to remove the plug from the boss; and then welding said boss into said hole.

5. A method as recited in claim 4, comprising the further steps, after said steps of claim 4, of:

pressure testing said weld; and unthreading said plug from said boss to remove said plug, said removal resulting in re-tapping of said threads in said boss.

6. A plug for use in welding a female-threaded said boss into a hole through a part, said plug comprising a head and a cylindrical portion extending below the head, the cylindrical portion having male threads adapted to be received by the female threads of the boss, the head having a minimum transverse dimension of at least the maximum transverse dimension of an upper surface of the boss so as to completely cover said upper surface, the cylindrical threaded portion of the plug having at least one thread-cutting edge defined therein, configured to re-tap the threads of the boss when an installed plug is rotated in the direction necessary to remove the plug from the boss, in combination with a copper cup washer having a centrally apertured flat portion positioned between said head and said boss, and a cup portion extending upwardly away from said flat portion and alongside said head, to isolate said head from said boss, thereby shielding said head and reducing any likelihood of said plug and said boss being accidentally welded together.

* * * * *